Aug. 7, 1945.    F. E. WOLCOTT    2,381,151
COFFEE AND TEA MAKER
Filed Feb. 17, 1943
Fig.1.
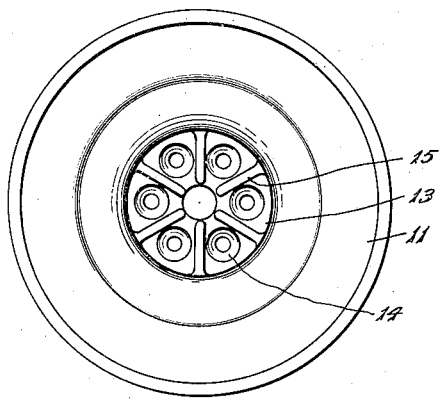
Fig.3.
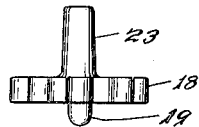
Fig.4.
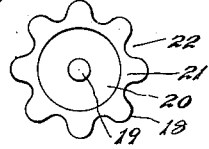
Fig.2.
Fig.5.
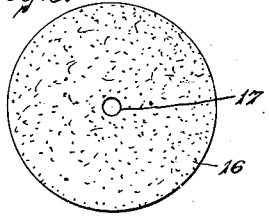
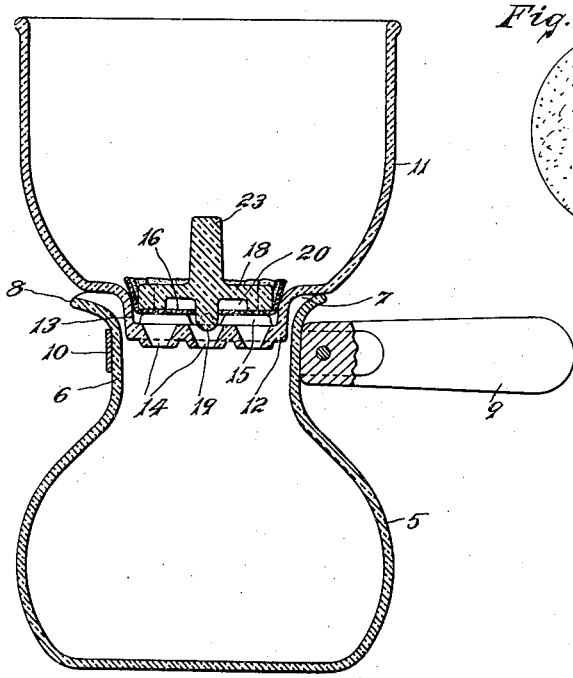
INVENTOR.
FRANK E. WOLCOTT.
BY Louis V. Lucia
ATTORNEY.

Patented Aug. 7, 1945

2,381,151

UNITED STATES PATENT OFFICE 2,381,151

COFFEE AND TEA MAKER

Frank E. Wolcott, West Hartford, Conn., assignor to The Silex Company, Hartford, Conn.

Application February 17, 1943, Serial No. 476,197

3 Claims. (Cl. 99—316)

This invention relates to coffee makers and particularly to those of the drip type having a lower and an upper bowl.

An object of the invention is to provide a coffee maker with certain improvements in the construction thereof which will render the same highly efficient in its operation for producing a brew of either coffee or tea having highly desirable qualities.

A still further object of the invention is to provide improved filtering means, for such coffee or tea maker, which will allow infusion of the water with the coffee grounds, or tea leaves, for the proper length of time to assure a high quality brew.

Further objects and advantages of the invention will be more clearly understood from the following description and from the accompanying drawing in which:

Fig. 1 is a plan view of the upper bowl of my improved coffee maker, with the filter members removed therefrom.

Fig. 2 is a side view, in central vertical section, of a coffee maker embodying my invention.

Fig. 3 is a side view, in elevation, of the drainer member.

Fig. 4 is a bottom view thereof.

Fig. 5 is a flat view of the strainer disc used in my invention.

As illustrated in the drawing, the numeral 5 denotes the lower bowl of the coffee maker, having a neck 6 and a mouth portion 7 with a pouring lip 8. A handle 9 is provided and secured to the neck 6 by means of a strap or band 10.

An upper bowl 11 is seated upon the top of the lower bowl and has a depending portion 12, in the bottom thereof, which is adapted to fit within the neck 6. A recess 13 is provided in the bottom of the upper bowl, within said depending portion, and the bottom of said recess has a series of openings 14 and a plurality of radial spacing ribs 15, upon said bottom, for supporting filtering means in spaced relation thereto.

A strainer 16, preferably in the form of a disc of pervious material and having a central opening 17, is supported on said ribs, across the recess 13 and retained in position thereon by means of a drainer plate 18 which has a central depending projection 19 that extends through the opening 17 to centralize the strainer disc thereon. The said drainer is preferably constructed with a recess 20 surrounding the projection 19 to provide a raised annular surface 21 which is scalloped along the edge thereof to provide notches 22 for permitting the flow of liquid past said drainer and through the strainer 20 when in operating position as illustrated in Fig. 2.

The said drainer member is also provided with a handle portion 23, is preferably constructed of imperforate material and is of a width sufficient to gravitatively retain the strainer member against displacement upon the spacing ribs and with the marginal edge portions of the strainer extending upwardly, as at 24, between the said drainer and the sides of the recess 13.

In the operation of my invention, the upper bowl 11 is placed upon the lower bowl 5 and the strainer 16 and drainer 18 are placed therein in the position shown. Coffee grounds or tea leaves are then placed in the upper bowl and hot water is poured in for the amount of brew required. The water will then become infused with the coffee or tea, and filter downwardly between the sides of the drainer member and the sides of the recess 13, through the strainer cloth 20 and through the openings 14 into the lower bowl as a completed brew.

It will be noted that the strainer member 20 is supported in spaced position above the bottom of the recess 13 and the tops of the openings 14. This serves to retain the strainer disc free for the flow of liquid therethrough so that the entire area of the strainer will be effective for the straining operation while, if the said strainer were permitted to rest into contact with the bottom of the recess 13, only the portions above the openings 14 would be effective for straining the liquid.

It will also be understood that, as soon as the hot water is poured into the upper bowl, the upstanding portions 25 of the strainer, will tend to turn downwardly against the walls of the recess 13 and thereby prevent seepage of the liquid around the strainer which would result in the deposit of sediment in the brew.

The drainer member 16, being constructed of an impervious material, is substantially heavy and therefore acts to firmly retain the strainer in operative position upon the spacing rims 15 so that it will not float to the top of the water when it is poured into the upper bowl. Further, the depending projection 19, extending through the opening 17 in the strainer, will serve to centralize the strainer on the drainer member 18 so as to assure retention of the strainer in correct position upon the ribs 15 and within the recess 13.

I claim:

1. In a brewer of the character described, a bowl having a recess in the bottom thereof and openings extending through the bottom of said recess, a plurality of raised surfaces on the bottom of said recess, a strainer member comprising a sheet of pervious material resting upon said surfaces in spaced position relative to said bottom, and a drainer member seated upon said strainer and having a plurality of notches along the edge thereof for permitting flow of liquid past said drainer and through the said strainer member.

2. A brewer of the character described comprising an upper bowl having a recess in the bottom thereof and a plurality of openings extending through the bottom of said recess, means for supporting a strainer member in spaced relation to the bottom of said recess, and a drainer member having a central projection in the bottom thereof extending through an opening in said strainer and partly depending into one of said openings.

3. In a brewer of the character described, a bowl having a recess in the bottom thereof and openings extending through the bottom of said recess, a plurality of raised surfaces on the bottom of said recess and a strainer member supported on said surfaces in spaced position relative to said bottom; a drainer member having an annular depending portion to retain said strainer in contact with said surfaces, and a plurality of notches in said portion to permit the flow of liquid through said strainer.

FRANK E. WOLCOTT.